United States Patent
Newcomb et al.

(10) Patent No.: US 12,510,224 B1
(45) Date of Patent: Dec. 30, 2025

(54) LIGHT GUIDE ENABLED CHROME APPEARANCE LAMP

(71) Applicant: GM Global Technology Operations LLC, Detroit, MI (US)

(72) Inventors: Bradley Allen Newcomb, Troy, MI (US); Jonglee Park, Novi, MI (US); Helgert Elezi, Warren, MI (US); Daniel W. Booth, Bloomfield Hills, MI (US); Julien P. Mourou, Bloomfield Hills, MI (US); Xiaosong Huang, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 19/036,290

(22) Filed: Jan. 24, 2025

(51) Int. Cl.
  *F21S 43/50* (2018.01)
  *F21S 43/245* (2018.01)
  *F21V 8/00* (2006.01)

(52) U.S. Cl.
  CPC .............. *F21S 43/50* (2018.01); *F21S 43/245* (2018.01); *G02B 6/0055* (2013.01); *G02B 6/006* (2013.01); *G02B 6/0061* (2013.01); *G02B 6/0065* (2013.01)

(58) Field of Classification Search
  CPC ...... F21S 43/245; F21S 43/50; G02B 6/0055; G02B 6/006; G02B 6/0061; G02B 6/0065
  See application file for complete search history.

(56) References Cited

U.S. PATENT DOCUMENTS

| | | | | |
|---|---|---|---|---|
| 2012/0318656 | A1* | 12/2012 | Chen | H01H 13/83 200/517 |
| 2021/0181406 | A1* | 6/2021 | Duce | B64D 11/00 |
| 2023/0235611 | A1* | 7/2023 | Wroblewski | E05F 15/73 49/31 |
| 2025/0004325 | A1* | 1/2025 | Lim | F21S 43/145 |

FOREIGN PATENT DOCUMENTS

| | | | |
|---|---|---|---|
| DE | 202006017445 U1 | 8/2007 | |
| DE | 202021104561 U1 * | 9/2021 | G02B 6/0058 |

* cited by examiner

*Primary Examiner* — Keith G. Delahoussaye
(74) *Attorney, Agent, or Firm* — Vivacqua Crane, PLLC

(57) ABSTRACT

A light guide enabled lamp includes a light guide. A light source positioned at an edge of the light guide directs light generated by energizing the light source throughout a length of the light guide reflective layer disposed on the light guide. A reflective layer is disposed on the light guide. A graphics pattern is formed on the light guide defining nano-scale optic patterns by a surface etching of the light guide. A polymeric material coating is applied over the light source, the light guide and the reflective layer. A coating is applied over the polymeric material coating using one of a wet coating process, a dry coating process, an in-mold injection-compression or lamination film application, and a post molding process.

14 Claims, 6 Drawing Sheets

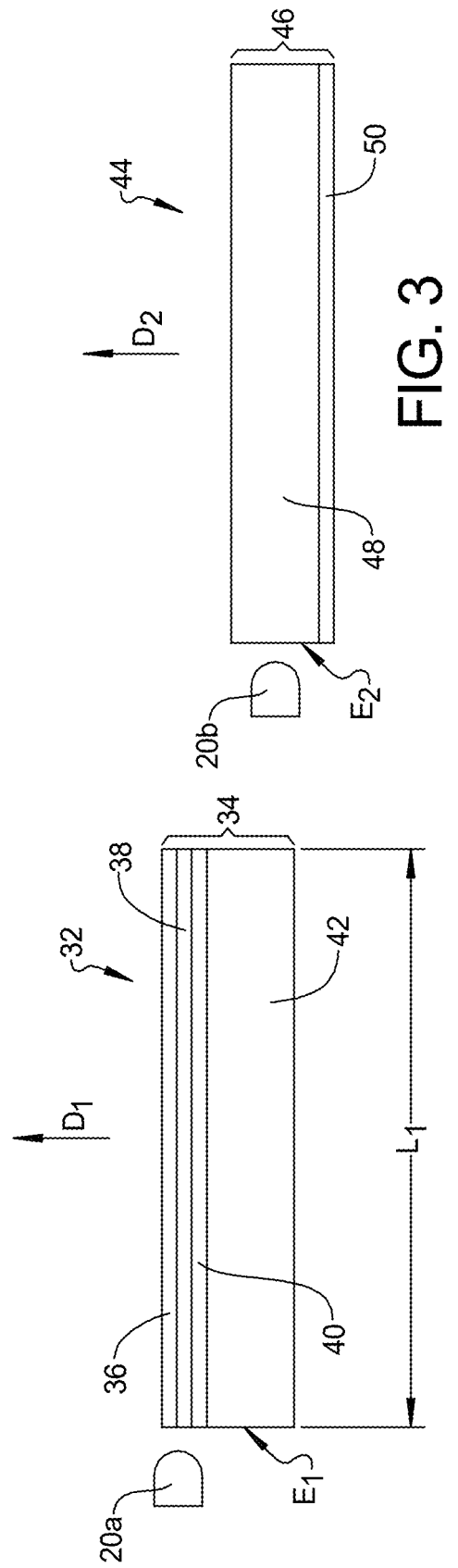

LIGHT GUIDE ENABLED CHROME APPEARANCE LAMP

INTRODUCTION

The present disclosure relates to light guides used in vehicle emblem and information presentation.

During vehicle operation, it is desirable to present emblems and information using light guide illuminated displays. Light sources used to illuminate the light guides are commonly positioned behind a chrome reflective layer of the display, and multiple light sources are used for light to effectively penetrate the chrome reflective layer to reach the light guide.

Thus, while current systems and methods to provide light guide enabled displays achieve their intended purpose, there is a need for a new and improved system and method to present vehicle emblems and information.

SUMMARY

According to several aspects, a light guide enabled lamp includes a light source. A light guide is positioned proximate to the light source. A reflective layer is disposed on the light guide. A polymeric material coating encompasses the light source, the light guide and the reflective layer.

In another aspect of the present disclosure, the reflective layer defines a chrome layer.

In another aspect of the present disclosure, the chrome layer is one of: a pre-coating applied onto the light guide using a physical vapor deposition (PVD) process; a pre-coating applied onto the light guide using an in-mold decorating treatment (IMDTR) process; and a lamination.

In another aspect of the present disclosure, the light guide defines one of a light guide film of a polyethylene terephthalate (PET) material and a polycarbonate (PC) material, the light guide film positioned on and bonded to the reflective layer, having the reflective layer bonded to a molded part.

In another aspect of the present disclosure, the light source faces an edge $E_1$ of the light guide film to direct light throughout a length $L_1$ of the light guide film; and the reflective layer reflects light rays generated by the light source from the light guide film off the reflective layer generally in a direction $D_1$ substantially perpendicular to the light guide film.

In another aspect of the present disclosure, a hard coating is applied over the polymeric material coating. The hard coating is applied using one of a wet coating process, a dry coating process, an in-mold injection-compression or lamination film application, and a post molding process.

In another aspect of the present disclosure, the light guide defines a light guide plate having the light source directing light into an edge $E_2$ of the light guide plate. The light guide plate is one of transparent and translucent, and of one of a polycarbonate material and a polymethyl methacrylate (PMMA) material. The reflective layer is applied to the light guide plate as a chrome material.

In another aspect of the present disclosure, graphics of the light guide enabled lamp defining nano-scale optic patterns formed onto the light guide by a surface etching of the light guide.

In another aspect of the present disclosure, the light source, the light guide, the reflective layer and the polymeric material coating are collectively manufactured using one of a lamination process and an injection compression overmolding process.

In another aspect of the present disclosure, the light guide includes a curved segment. A nanofilm is applied to a portion of an inner concave-shaped surface of the curved segment. The nanofilm has a first refractive index different from a second refractive index of the light guide. The nanofilm reduces light passing through the curved segment to produce homogeneous lighting from the light guide and to mitigate against light hot-spots of the light guide.

According to several aspects, a light guide enabled lamp includes a light guide. A light source is positioned facing an edge of the light guide to direct light generated by energizing the light source throughout a length of the light guide. A reflective layer disposed on the light guide. A graphics pattern is formed on the light guide. A polymeric material coating is applied over the light source, the light guide and the reflective layer. A coating is applied over the polymeric material coating, the coating being applied using one of a wet coating process defining a process for applying a liquid coating to a substrate, a dry coating process defining a process for applying particles or a pigment coating material to a substrate, an in-mold injection-compression or lamination film application, and a post molding process.

In another aspect of the present disclosure, the graphics pattern defines nano-scale optic patterns created as etchings on a surface of the light guide.

In another aspect of the present disclosure, the etchings define multiple valleys and peaks to redirect light rays.

In another aspect of the present disclosure, a curved segment of the light guide has a reduced density of the optic patterns to decrease light emitted at the curved segment thereby generating a homogeneous light output from the light guide.

In another aspect of the present disclosure, the light guide defines one of a transparent polymeric material and a translucent polymeric material provided as one of a film and a guide plate.

In another aspect of the present disclosure, the reflective layer defines a chrome layer created using a physical vapor deposition process.

In another aspect of the present disclosure, the reflective layer defines a chrome film applied onto the light guide as one of an enhanced specular reflector film and a Bragg mirror sheet.

According to several aspects, a method for forming a light guide enabled lamp comprises: positioning a reflective layer, a light guide and a light source into a cavity of a first mold section of a mold; bringing a second mold section into contact with the first mold section to close the mold; injecting a polymeric resin into the cavity to surround the reflective layer, the light guide and the light source; applying a force to the second mold section to compress the polymeric resin within the cavity creating a sealed assembly of the reflective layer, the light guide and the light source; lifting the second mold section away from the first mold section; and removing the sealed assembly from the cavity of the first mold section.

In another aspect of the present disclosure, the method further includes holding the force for a predetermined time period allowing the polymeric resin to set prior to lifting the second mold section.

In another aspect of the present disclosure, the method further includes pre-coating the reflective layer using chrome onto the light guide. pre-coating the reflective layer using chrome onto the light guide Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a side elevational view of a first aspect of the light guide enabled lamp of FIG. 1;

FIG. 3 is an end elevational view of a second aspect of the light guide enabled lamp of FIG. 1;

DETAILED DESCRIPTION

The following description is merely exemplary in nature and is not intended to limit the present disclosure, application, or uses.

Figure 1:
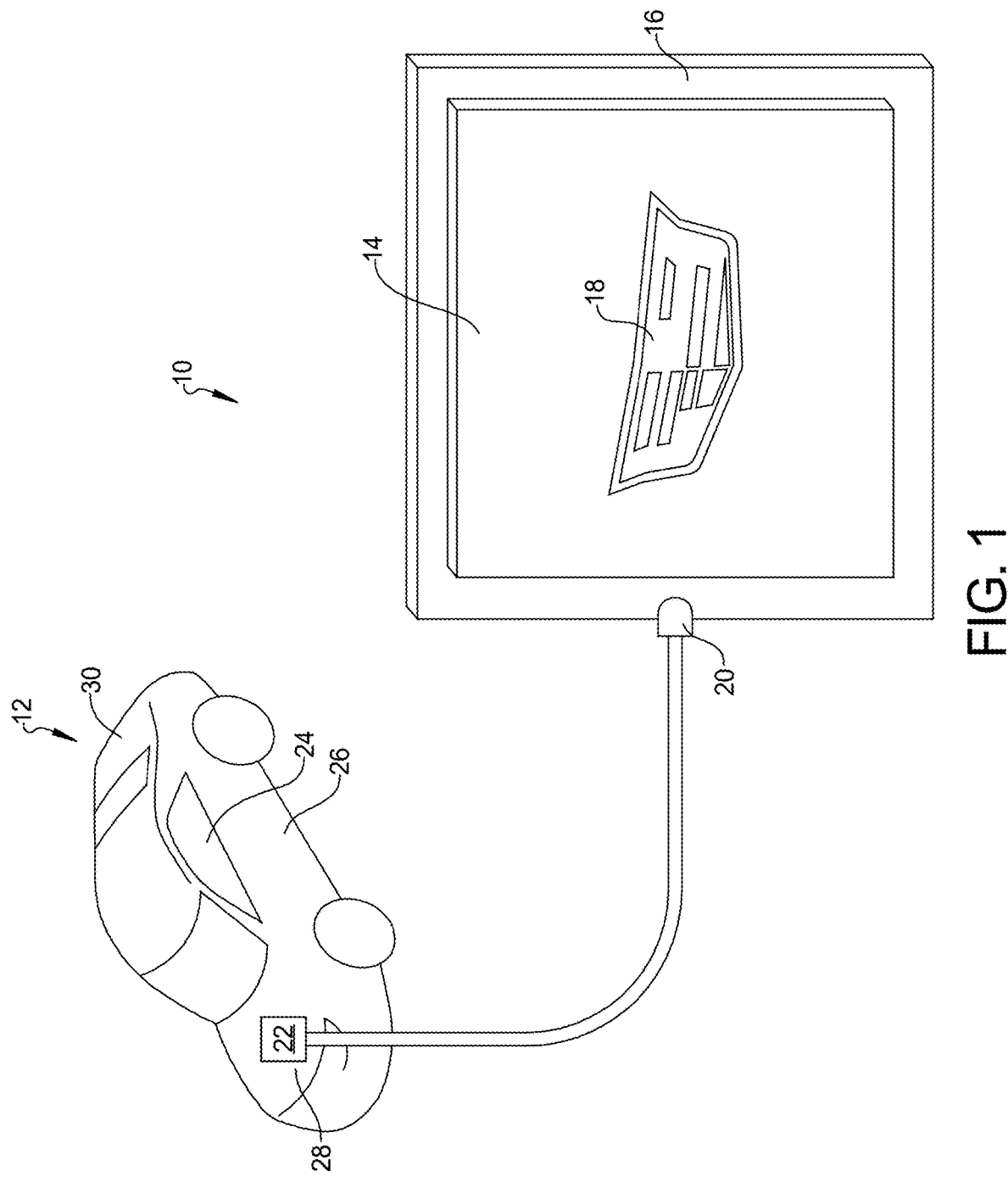
FIG. 1 is a side elevational view of a light guide enabled lamp according to an exemplary aspect.

Referring to FIG. 1, a light guide enabled lamp 10 is provided with a vehicle 12 such as a sedan, a sport utility vehicle, a truck, or a van, the vehicle 12 defining a gasoline powered vehicle, a battery electric vehicle or an autonomously operated vehicle. The light guide enabled lamp 10 includes a light guide 14 for example of a transparent or a translucent polymeric material provided as a film or a guide plate. A reflective layer 16 such as a chrome layer is disposed on the light guide 14. The light guide enabled lamp 10 defines a hidden-until-lit lamp having an emblem 18 that is initially hidden until illuminated by light passed through the light guide 14 by energizing a light source 20 such as a light emitting diode (LED), a micro LED (uLED), or multiple light sources. Energy to illuminate the light source 20 is provided by an energy source 22 of the vehicle 12 such as a battery or an alternator. The light guide enabled lamp 10 may be positioned at, in or on any feature of the vehicle 12 including a window 24, a door 26, a hood 28, or a trunk or rear panel 30.

Referring to FIG. 2 and again to FIG. 1, the light guide enabled lamp 10 described in reference to FIG. 1 may take multiple forms which according to several aspects includes a first light guide enabled lamp 32. The first light guide enabled lamp 32 includes a multiple layer assembly 34 having a coating 36 of a polymeric thermoset material such as polyurethane applied onto a separate layer defining a light guide film 38 of a polyethylene terephthalate (PET) or a polycarbonate (PC) material. The light guide film 38 is positioned on and may be bonded to a reflective layer 40 such as a chrome layer which is itself bonded to a molded part 42. In lieu of passing light from a light source 20a through the reflective layer 40 into the light guide film 38, the light source 20a is positioned at an edge $E_1$ of the light guide film 38 and thereby directs light throughout a length $L_1$ of the light guide film 38, with the reflective layer 40 bouncing light rays reflected or refracted from the light guide film 38 off the reflective layer 40 and out of the first light guide enabled lamp 32 through the coating 36 generally in a direction $D_1$ perpendicular to the light guide film 38.

Referring to FIG. 3 and again to FIGS. 1 and 2, the multiple forms of the light guide enabled lamp 10 described in reference to FIG. 1 according to several aspects may also include a second light guide enabled lamp 44. The second light guide enabled lamp 44 includes an embedded light guide and reflective layer assembly 34 having a light source 20b directing light into an edge $E_2$ of a molded light guide plate 48. The light guide plate 48 is transparent or translucent and may be of a PC material or a polymethyl methacrylate (PMMA) material. A reflective layer 50 is applied to the light guide plate 48 which may be a chrome material and functions similar to the reflective layer 40 described in reference to FIG. 2. The reflective layer 50 bounces light rays generated by the light source 20b into the light guide plate 48 and out of the second light guide enabled lamp 44 generally in a direction $D_2$.

Referring to FIG. 4 and again to FIGS. 1 through 3, the multiple forms of the light guide enabled lamp 10 described in reference to FIG. 1 according to several aspects may also include a third light guide enabled lamp 52. According to several aspects, the third light guide enabled lamp 52 when positioned on the window 24 of the vehicle 12 may be opaque or substantially invisible to a viewer positioned outside of the vehicle 12 when not energized, as shown.

Figure 4:
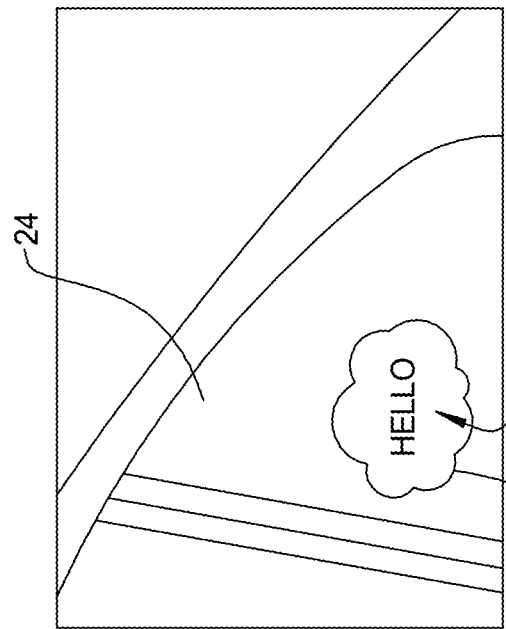
FIG. 4 is an end elevational view of a vehicle window of FIG. 1 having the light guide enabled lamp deenergized.

Referring to FIG. 5 and again to FIG. 4, the third light guide enabled lamp 52 when energized is clearly visible to the viewer positioned outside of the vehicle 12. An exemplary emblem 54 when energized and visible to the viewer may take any visible form selected by the designer, including but not limited to a vehicle designation make or model emblem, advertising information, sales information, or the like.

Figure 5:
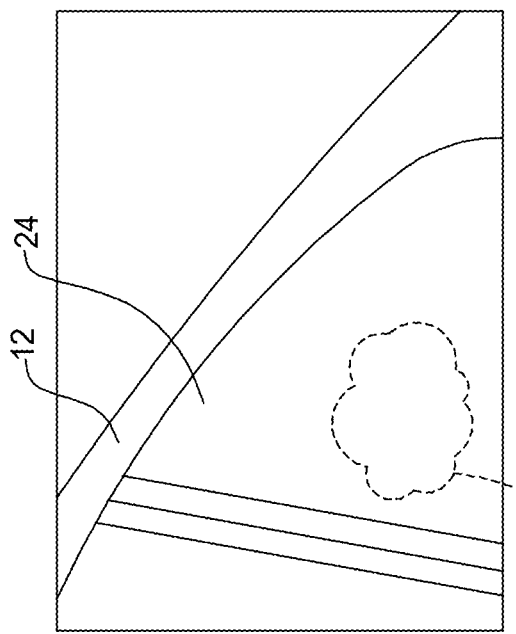
FIG. 5 is a side elevational view of the vehicle window of FIG. 4 modified to present the light guide enabled lamp when energized.

Referring to FIG. 6 and again to FIGS. 4 and 5, graphics of the third light guide enabled lamp 52 may be created by forming nano-scale optic patterns onto a light guide 56 such as a first nano-scale optic pattern 58, a second nano-scale optic pattern 60 and a third nano-scale optic pattern 62 which may be created such as by etching a surface 64 of the light guide 56. The etching may include forming multiple valleys 66 and peaks 68 which redirect light rays 70 created by energizing a light source 20c directed at an edge $E_3$ of the light guide 56.

Referring to FIG. 7 and again to FIGS. 1 through 6, an exemplary injection compression molding process may be used to create light guide enabled lamps 10 of the present disclosure. In a first molding step components of a light guide enabled lamp 72 similar to the second light guide enabled lamp 44 and including a reflective layer 74, a light guide 76 and a light source 20d are positioned into a mold 78. The components of the light guide enabled lamp 72 are positioned in a cavity 80 of a first mold section 82 of the mold 78. A second mold section 84 is initially spaced away from the first mold section 82 to allow loading the mold 78.

Figure 7:
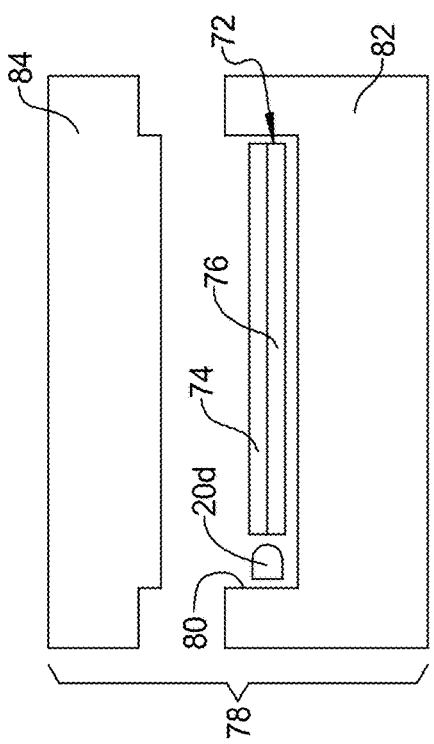
FIG. 7 is a side elevational view of an open compression mold for forming a light guide enabled lamp of the present disclosure.

Referring to FIG. 8 and again to FIG. 7, in a second molding step the second mold section 84 is brought down onto the first mold section 82 to close the mold 78. A transparent or translucent resin 86 such as PC or PMMA resin is injected into the cavity 80 and surrounds the components of the light guide enabled lamp 72.

Figure 8:
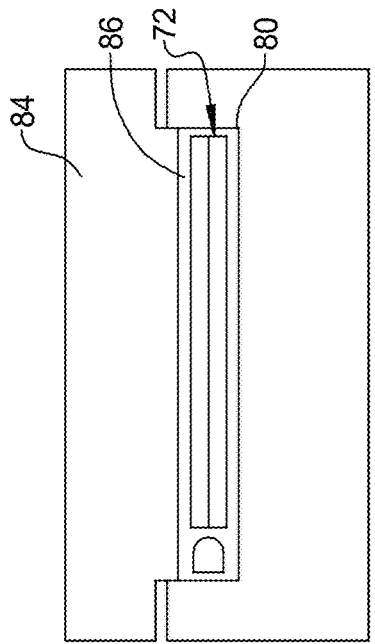
FIG. 8 is a side elevational view of the compression mold of FIG. 7 in a closed position.

Referring to FIG. 9 and again to FIGS. 7 and 8, in a third molding step a force 88 is applied to the second mold section 84 to compress the resin 86 within the cavity 80. After a predetermined time period allowing the resin 86 to set about the components of the light guide enabled lamp 72, the force 88 is removed.

Figure 10:
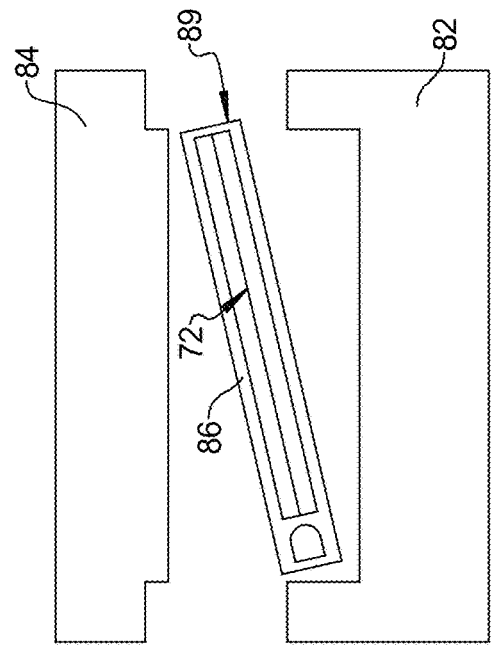
FIG. 10 is a side elevational view of the compression mold of FIG. 9 in a mold open condition following injection.
Figure 9:
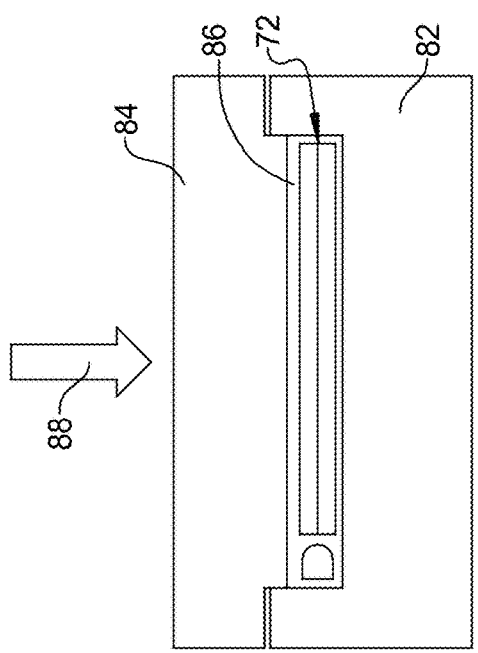
FIG. 9 is a side elevational view modified from FIG. 8 to present a polymeric material during injection.

Referring to FIG. 10 and again to FIGS. 7 through 9, the second mold section 84 is lifted from the first mold section 80. A sealed assembly 89 having the resin 86 set about the components of the light guide enabled lamp 72 is then removed from the mold 78.

Figure 11:
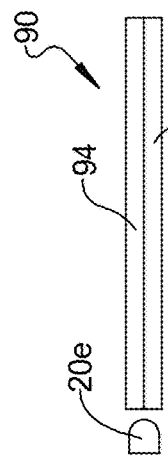
FIG. 11 is a side elevational view of a chrome reflective layer provided for a light guide in a pre-coating process.

Referring to FIG. 11 and again to FIG. 3, a light guide enabled lamp 90 may be manufactured using a pre-coating process to pre-coat a reflective layer 92 using a reflective material such as chrome onto a light guide 94. A light source 20e is also provided with the light guide enabled lamp 90. Pre-coating the reflective layer 92 may be accomplished using a physical vapor deposition (PVD) process or an in-mold decorating treatment (IMDTR) process.

Figure 12:
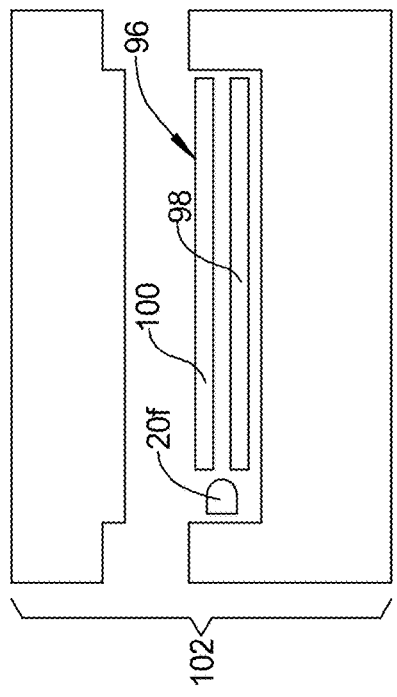
FIG. 12 is a side elevational view of a chrome reflective layer added to a light guide during a co-molding process.

Referring to FIG. 12 and again to the molding process described in reference to FIGS. 7 through 10, a light guide enabled lamp 96 may be manufactured using a co-molding process wherein a reflective material sheet 98 is joined to a light guide 100 using a pressure mold 102. A light source 20f is also provided with the light guide enabled lamp 96. According to several aspects, the reflective material sheet 98 may define an enhanced specular reflector (ESR) film or a Bragg mirror sheet defining a type of mirror composed of multiple layers of a dielectric material, commonly deposited on a substrate of a glass material or other optical material.

Figure 13:
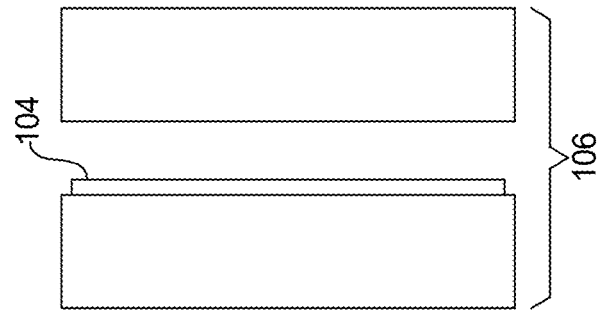
FIG. 13 is a side elevational view of a graphic imprinted film formed using an in-mold decorating treatment (IM-DTR) process.

Referring to FIG. 13 and again to FIGS. 7 through 10 and 11, the in-mold decorating treatment (IMDTR) process discussed above with respect to FIG. 11 may include a graphic imprinted film 104 which is placed in the mold 78.

Referring to FIG. 14 and again to FIG. 3, a light guide 110 used in a light guide enabled lamp of the present disclosure may include a curved segment 112. At the curved segment 112 more reflected light may exit the light guide 110 than at a straight segment 114 of the light guide 110 due to a higher exit angle at the curved segment 112. The increased reflected light may cause undesirable localized light hot-spots.

Figure 6:
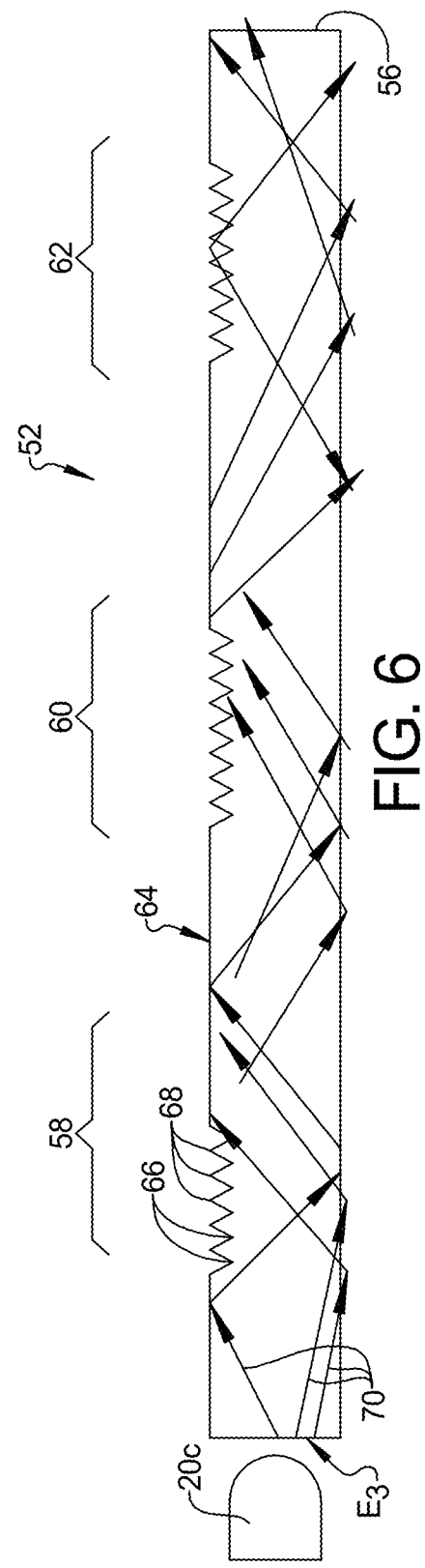
FIG. 6 is an end elevational view the light guide enabled lamp of FIG. 5.
Figure 14:
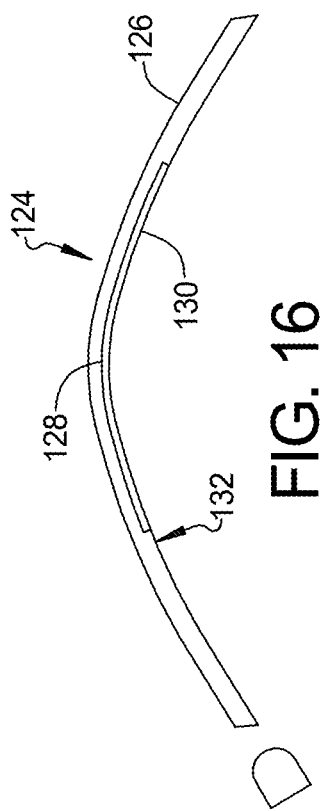
FIG. 14 is a side elevational view of a curved light guide.

Referring to FIG. 15 and again to FIGS. 6 and 14, to mitigate against localized light hot-spots, the light guide 110 may include optic patterns having different grain densities selectively pre-positioned or formed in the light guide 110. Light hot-spots are herein defined as an area or multiple areas within a space that receives a higher level of illumination compared to its immediate surroundings. For example, a first optic pattern 116 creating a first level of light brightness 118 may be located at or within the curved segment 112 described in reference to FIG. 14. A second optic pattern 120 which creates a second level of light brightness 122 greater than the level of light brightness 118 may be prepositioned in the straight segment 114 of the light guide 110 where light hot-spots are not an issue, thereby producing homogeneous lighting from the light guide 110.

Figure 15:
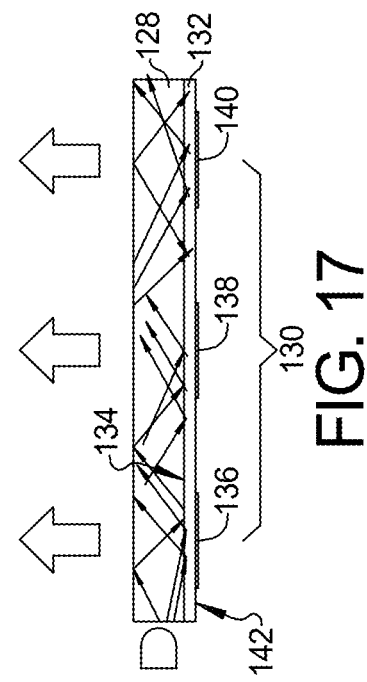
FIG. 15 is an end elevational view of the curved light guide of FIG. 14.

Referring to FIG. 16 and again to FIGS. 14 and 15, a light guide enabled lamp 126 of the present disclosure may include a light guide 126 having a curved segment 128. To produce homogeneous lighting from the light guide 126 and mitigate against light hot-spots, a nanofilm 130 may be locally applied to a portion of an inner concave-shaped surface 132 at the curved segment 128. The nanofilm 130 functions to reduce light passing through the curved segment 128.

Figure 16:
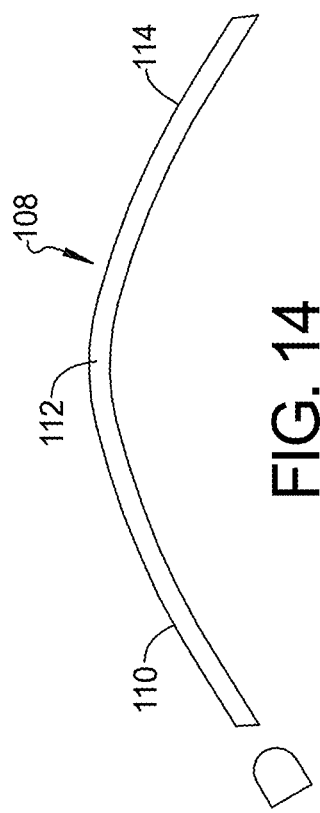
FIG. 16 is a side elevational view of a curved light guide having a nano film locally applied to an inner radius of the curved light guide.
Figure 17:
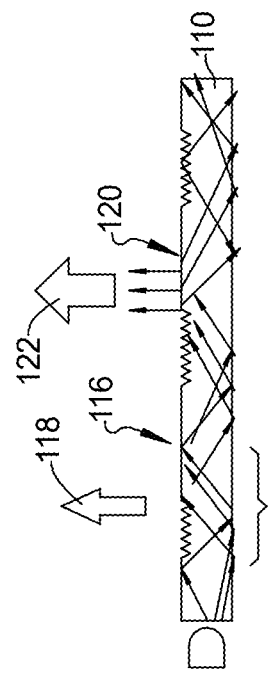
FIG. 17 is an end elevational view of the locally applied nano film of FIG. 16.

Referring to FIG. 17 and again to FIG. 16, prior to installation of the nanofilm 130, an optical bonding layer 132 is adhered, bonded or placed on a surface 134 of the light guide 126 where the concave-shaped surface 132 will be located. The nanofilm 130 is then formed of multiple segments which may by example include a first nanofilm segment 136, a second nanofilm segment 138 and a third nanofilm segment 140. The nanofilm segments are applied to an outer facing surface 142 of the optical bonding layer 132. According to several aspects, the optical bonding layer 132 has a first refractive index n1 and the nanofilm 130 has a second refractive index n2 different from the first refractive index n1.

A light guide enabled lamp 10 of the present disclosure offers several advantages. These include: a light source such as an LED, a uLED, or multiple light sources containing: a light guide film or a guide plate; and a chrome or a reflective layer. The reflective layer may be: pre-coated onto the light guide layer using a PVD process, pre-coated onto the light guide layer using an in-mold decoration process, laminated onto a light guide layer. A polyurethane coating or a weathering hard coat is applied which are application and material dependent. An optic pattern intensity of the light guide enabled lamp is heterogeneous to achieve homogeneous lighting in non-planar components. A nanofilm of different refractive index than a refractive index of the glass/polymer may be locally applied to achieve homogeneous lighting for non-planar components. The light guide enabled lamp may be manufactured using one of the following methods: a lamination process; or an injection compression over-molding process. A hard coating for UV/scratch and mar/environmental protection may be applied via a wet coating or a dry coating process, in-mold injection-compression or lamination film application, or a post-molding film application.

What is claimed is:

1. A light guide enabled lamp, comprising:
a light source;
a light guide positioned proximate to the light source, wherein the light guide includes a curved segment;
a nanofilm applied to a portion of an inner concave-shaped surface of the curved segment, the nanofilm having a first refractive index different from a second refractive index of the light guide, the nanofilm reducing light passing through the curved segment to produce homogeneous lighting from the light guide and to mitigate against light hot-spots of the light guide;
a reflective layer disposed on the light guide; and
a polymeric material coating encompassing the light source, the light guide and the reflective layer.

2. The light guide enabled lamp of claim 1, wherein the reflective layer defines a chrome layer.

3. The light guide enabled lamp of claim 2, wherein the chrome layer is one of:

a pre-coating applied onto the light guide using a physical vapor deposition (PVD) process;
a pre-coating applied onto the light guide using an in-mold decorating treatment (IMDTR) process; and
a lamination.

4. The light guide enabled lamp of claim 1, wherein the light guide defines one of a light guide film of a polyethylene terephthalate (PET) material and a polycarbonate (PC) material, the light guide film positioned on and bonded to the reflective layer, having the reflective layer bonded to a molded part.

5. The light guide enabled lamp of claim 4, wherein:
the light source is positioned facing an edge ($E_1$) of the light guide film to direct light throughout a length ($L_1$) of the light guide film; and
the reflective layer reflects light rays generated by the light source from the light guide film off the reflective layer generally in a direction ($D_1$) substantially perpendicular to the light guide film.

6. The light guide enabled lamp of claim 1, including a coating applied over the polymeric material coating, the coating applied using one of a wet coating process, a dry coating process, an in-mold injection-compression or lamination film application, and a post molding process.

7. The light guide enabled lamp of claim 1, wherein:
the light guide defines a light guide plate having the light source directing light into an edge ($E_2$) of the light guide plate, the light guide plate being one of transparent and translucent, and of one of a polycarbonate material and a polymethyl methacrylate (PMMA) material; and
the reflective layer is applied to the light guide plate as a chrome material.

8. The light guide enabled lamp of claim 1, further including graphics of the light guide enabled lamp defining nano-scale optic patterns formed onto the light guide by a surface etching of the light guide.

9. The light guide enabled lamp of claim 1, wherein the light source, the light guide, the reflective layer and the polymeric material coating are collectively manufactured using one of a lamination process and an injection compression overmolding process.

10. A light guide enabled lamp, comprising:
a light guide, wherein the light guide includes a curved segment;
a light source positioned facing an edge of the light guide to direct light generated by energizing the light source throughout a length of the light guide;
a reflective layer disposed on the light guide;
a graphics pattern formed on the light guide, wherein the graphics pattern defines nano-scale optic patterns created as etchings on a surface of the light guide;
a polymeric material coating applied over the light source, the light guide and the reflective layer; and
a coating applied over the polymeric material coating, the coating
applied using one of a wet coating process, a dry coating process, an in-mold injection-compression or lamination film application, and a post molding process,
wherein the curved segment of the light guide includes a reduced density of the optic patterns to decrease light emitted at the curved segment thereby generating a homogeneous light output from the light guide.

11. The light guide enabled lamp of claim 10, wherein the etchings define multiple valleys and peaks to redirect light rays.

12. The light guide enabled lamp of claim 10, wherein the light guide defines one of a transparent polymeric material and a translucent polymeric material provided as one of a film and a guide plate.

13. The light guide enabled lamp of claim 10, wherein the reflective layer defines a chrome layer created using a physical vapor deposition process.

14. The light guide enabled lamp of claim 10, wherein the reflective layer defines a chrome film applied onto the light guide as one of an enhanced specular reflector film and a Bragg mirror sheet.

* * * * *